United States Patent
Manahan

(10) Patent No.: US 8,908,357 B2
(45) Date of Patent: Dec. 9, 2014

(54) SELF-ALIGNING ACTUATOR FOR DOOR-OPERATED SWITCH

(75) Inventor: Joseph Michael Manahan, Manlius, NY (US)

(73) Assignee: Cooper Technologies Company, Houston, TX (US)

( * ) Notice: Subject to any disclaimer, the term of this patent is extended or adjusted under 35 U.S.C. 154(b) by 421 days.

(21) Appl. No.: 13/331,603

(22) Filed: Dec. 20, 2011

(65) Prior Publication Data
US 2012/0162861 A1 Jun. 28, 2012

Related U.S. Application Data

(60) Provisional application No. 61/426,438, filed on Dec. 22, 2010.

(51) Int. Cl.
*H02B 1/30* (2006.01)
*H01H 3/02* (2006.01)
*H01H 71/56* (2006.01)
*H01H 3/54* (2006.01)
*H01H 9/04* (2006.01)
*H01H 71/04* (2006.01)
*H02B 1/28* (2006.01)
*H02B 1/38* (2006.01)

(52) U.S. Cl.
CPC .............. *H01H 71/56* (2013.01); *H01H 3/54* (2013.01); *H01H 9/042* (2013.01); *H01H 2071/042* (2013.01); *H02B 1/28* (2013.01); *H02B 1/38* (2013.01)
USPC ..................... 361/643; 200/50.04; 200/50.05; 200/50.13; 200/331; 200/332

(58) Field of Classification Search
CPC ... H01H 71/52; H01H 71/526; H01H 71/527; H01H 71/56; H01H 71/60; H01H 2071/042; H01H 9/042; H01H 9/045; H01H 9/046; H01H 9/22; H01H 19/635; H01H 3/54; H02B 1/44; H02B 1/28; H02B 1/38
USPC .......... 200/50.02, 50.04–50.06, 50.12, 50.13, 200/50.18, 329–331, 336, 337, 332; 361/643
See application file for complete search history.

(56) References Cited

U.S. PATENT DOCUMENTS 2,806,099 A * 9/1957 Rexroad .................... 200/50.05
3,500,668 A 3/1970 Henry
(Continued)

FOREIGN PATENT DOCUMENTS

| CA | 961900 | 1/1975 |
|---|---|---|
| DE | 4210371 A1 | 10/1993 |
| DE | 4210371 C2 | 3/1996 |

*Primary Examiner* — Anatoly Vortman
*Assistant Examiner* — Jacob Crum
(74) *Attorney, Agent, or Firm* — King & Spalding LLP

(57) ABSTRACT

An actuator system for operating a switch is described herein. The actuator system can include a shaft of a handle assembly. The shaft couples to a handle and a male coupling element and has a number of positions. Further, a coupling body of a switch assembly can be positioned in the number of positions. The coupling body engages the switch and has a female coupling element, which has a slotted portion that receives the male coupling element and an angled terminus that aligns the shaft to a first position as the shaft couples to the coupling body. The slotted portion receives and engages the male coupling element when the shaft is coupled to the coupling body. The slotted portion prevents the male coupling element from disengaging when the coupling body is in a second position, and disengages the male coupling element when the coupling body is in the first position.

22 Claims, 10 Drawing Sheets

(56) References Cited

U.S. PATENT DOCUMENTS

| | | | |
|---|---|---|---|
| 3,674,962 A | 7/1972 | Kroeger | |
| 3,735,078 A | 5/1973 | Appleton et al. | |
| 3,768,321 A | 10/1973 | Cox | |
| 3,980,845 A | 9/1976 | Gryctko et al. | |
| 4,032,732 A | 6/1977 | Homberg et al. | |
| 4,118,607 A | 10/1978 | Shaffer | |
| 5,286,935 A * | 2/1994 | Mina et al. | 200/330 |
| 5,634,553 A | 6/1997 | Hopper et al. | |
| 5,775,481 A | 7/1998 | Lyke | |
| 6,194,983 B1 | 2/2001 | Bogdon et al. | |
| 6,974,922 B2 | 12/2005 | Bortolloni et al. | |
| 6,989,499 B2 | 1/2006 | Bortolloni et al. | |
| 7,420,133 B2 * | 9/2008 | Farrow et al. | 200/50.15 |
| 7,772,510 B2 * | 8/2010 | Manahan et al. | 200/50.02 |
| 7,952,039 B2 * | 5/2011 | Manahan et al. | 200/50.02 |
| 8,420,962 B2 * | 4/2013 | Dodal et al. | 200/50.02 |
| 2009/0065339 A1 | 3/2009 | Blankemeyer et al. | |
| 2010/0065406 A1 | 3/2010 | Billard et al. | |
| 2010/0263994 A1 | 10/2010 | Manahan et al. | |

* cited by examiner

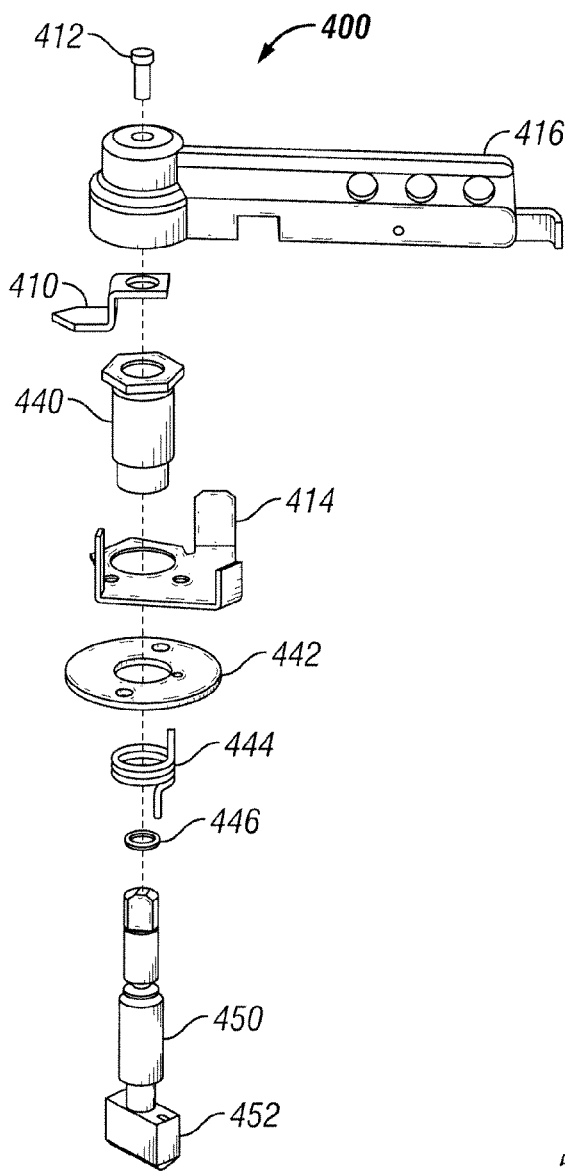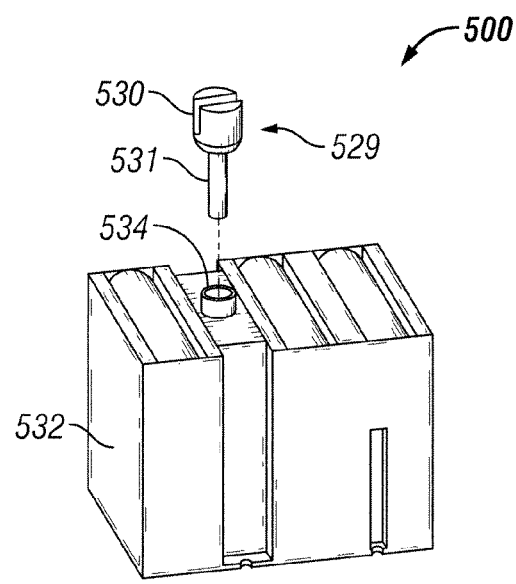
FIG. 4
FIG. 5

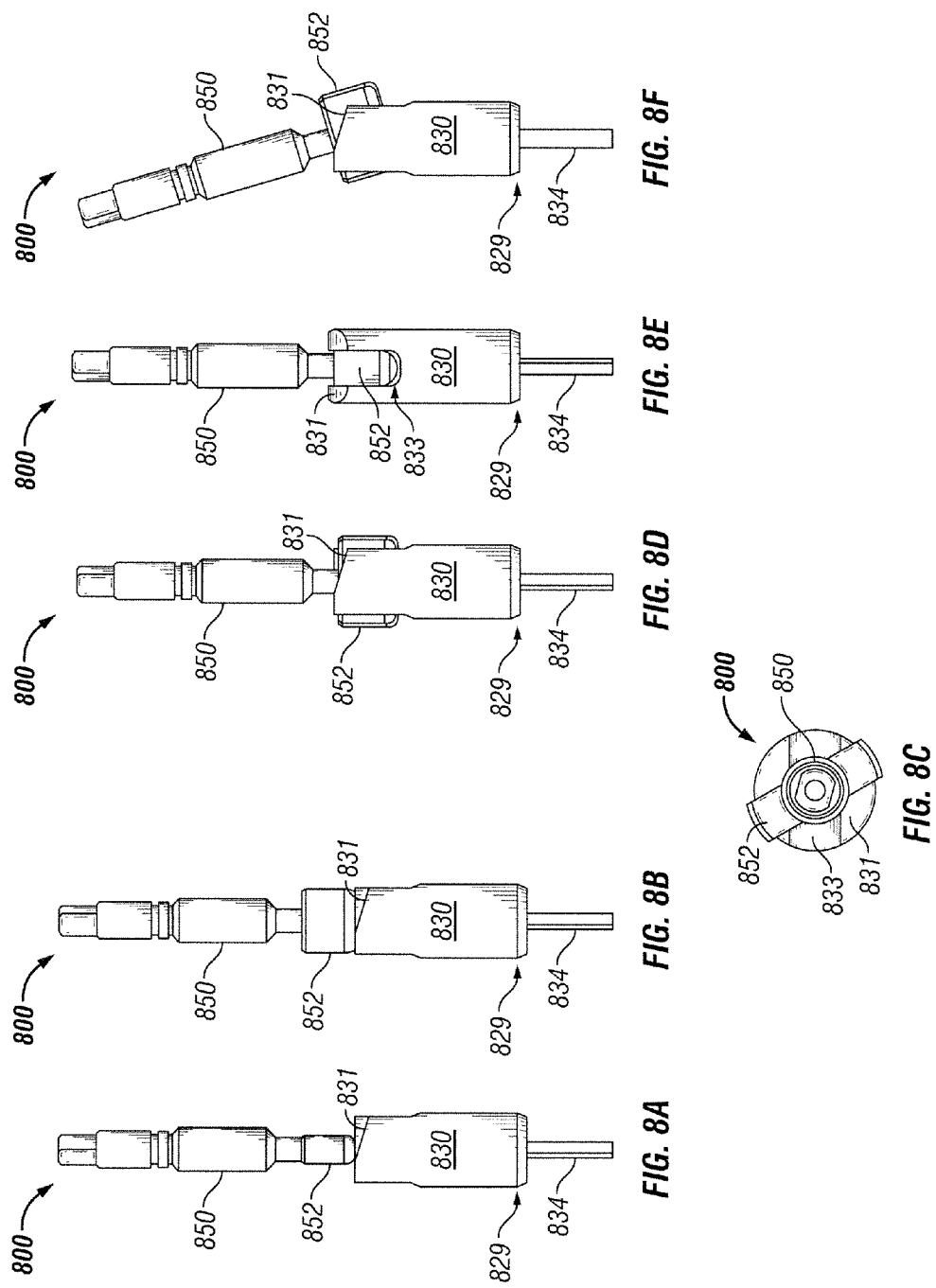

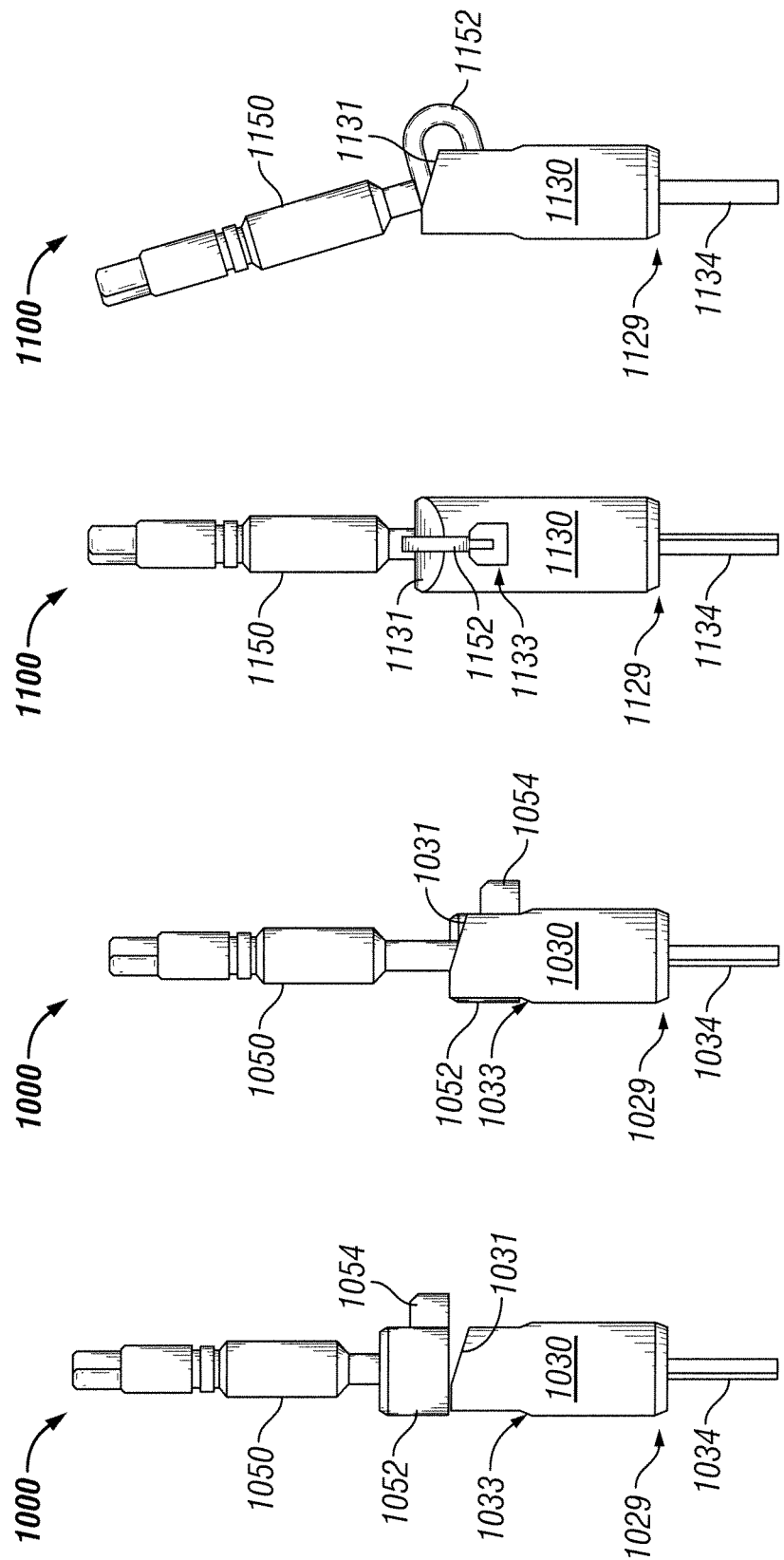

SELF-ALIGNING ACTUATOR FOR DOOR-OPERATED SWITCH

CROSS-REFERENCE TO RELATED APPLICATIONS

This application claims priority under 35 U.S.C. §119 to U.S. Provisional Patent Application Ser. No. 61/426,438, titled "Self-Aligning Actuator for Through Door Operated Disconnect Switch" and filed on Dec. 22, 2010, the entire contents of which are hereby incorporated herein by reference.

TECHNICAL FIELD

The present disclosure relates generally to actuating multiple features of a device, and more particularly to systems, methods, and devices for actuating one or more features of a device located within an explosion-proof enclosure using a keypad located outside the explosion-proof enclosure.

BACKGROUND

Explosion-proof receptacle housings and enclosure systems are used in many different industrial applications. Such explosion-proof receptacle housing and enclosure systems may be used, for example, in military applications, onboard ships, assembly plants, power plants, oil refineries, petrochemical plants, and other harsh environments. At times, the equipment (e.g., variable frequency drives (VFDs)) located inside such explosion-proof receptacle housing and enclosure systems is used to control motors and other industrial equipment. Other equipment that operates on a switch and/or uses electricity may also be located inside an explosion-proof enclosure.

At times, a user may need to operate a switch, located inside the explosion-proof enclosure, to change a mode of operation of one or more components inside the explosion-proof enclosure. A handle or knob, mechanically coupled to the switch located inside the explosion-proof enclosure, may be located on an outer surface (e.g., on the door) of the explosion-proof enclosure. In such a case, the user may operate the handle or knob to change the position of the switch without opening the explosion-proof enclosure.

SUMMARY

In general, in one aspect, the disclosure relates to an actuator system for operating a switch. The actuator system can include a shaft of a handle assembly, where the shaft can be positioned in a number of positions. The shaft can include a first shaft end portion for coupling to a handle and a second shaft end portion that includes a male coupling element. The actuator system can further include a coupling body of a switch assembly, where the coupling body can be positioned in the same number of positions. The coupling body can include a first coupling end portion for engaging the switch and a second coupling end portion that includes a female coupling element. The female coupling element includes a slotted portion and an angled terminus, where the slotted portion receives the male coupling element of the second shaft end portion. Also, the angled terminus of the female coupling element aligns, using the male coupling element, the shaft to a first position as the shaft couples to the coupling body. Further, the slotted portion receives and engages the male coupling element when the shaft is coupled to the coupling body. Also, the number of positions corresponds to a number of switch positions. Further, when the shaft is coupled to the coupling body, the slotted portion prevents the male coupling element from disengaging when the shaft and the coupling body are in a second position, and the slotted portion disengages the male coupling element when the shaft and the coupling body are in the first position.

In another aspect, the disclosure can generally relate to a method for operating a switch. The method can include rotating a handle, mounted on an outer surface of a door coupled to an enclosure body, from a first position to a second position. The method can also include separating, after rotating the handle to the second position, the door from the enclosure body. The handle is coupled to a shaft that includes a first shaft end portion for coupling to the handle and a second shaft end portion. Also, the second shaft end portion includes a male coupling element that can align with a female coupling element of a first coupling end portion of a coupling body. Further, the coupling body includes a second coupling end portion for engaging the switch. Also, the female coupling element includes a slotted portion and an angled terminus, where the slotted portion can receive and engage the male coupling element of the second shaft end portion when the shaft is coupled to the coupling body. Further, the positions correspond to a number of switch positions. Also, the slotted portion prevents the male coupling element from disengaging when the shaft and the coupling body are in the first position. Further, the slotted portion disengages the male coupling element when the shaft and the coupling body are in the second position.

These and other aspects, objects, features, and embodiments of the present invention will be apparent from the following description and the appended claims.

BRIEF DESCRIPTION OF THE DRAWINGS

The drawings illustrate only exemplary embodiments of a self-aligning actuator for a door-operated switch and are therefore not to be considered limiting of its scope, as the invention may admit to other equally effective embodiments. The elements and features shown in the drawings are not necessarily to scale, emphasis instead being placed upon clearly illustrating the principles of the exemplary embodiments. Additionally, certain dimensions or positions may be exaggerated to help visually convey such principles. In the drawings, reference numerals designate like or corresponding, but not necessarily identical, elements.

FIG. 4 shows an exploded side view of a handle assembly in accordance with one or more exemplary embodiments.

FIG. 5 shows an exploded side view of a switch assembly in accordance with one or more exemplary embodiments.

FIGS. 8A through 8F show an example in accordance with one or more exemplary embodiments.

FIGS. 10A and 10B show an example of a configuration of a male coupling element and a female coupling element in accordance with one or more exemplary embodiments.

FIGS. 11A and 11B show an example of a configuration of a male coupling element and a female coupling element in accordance with one or more exemplary embodiments.

DETAILED DESCRIPTION

Figure 1:
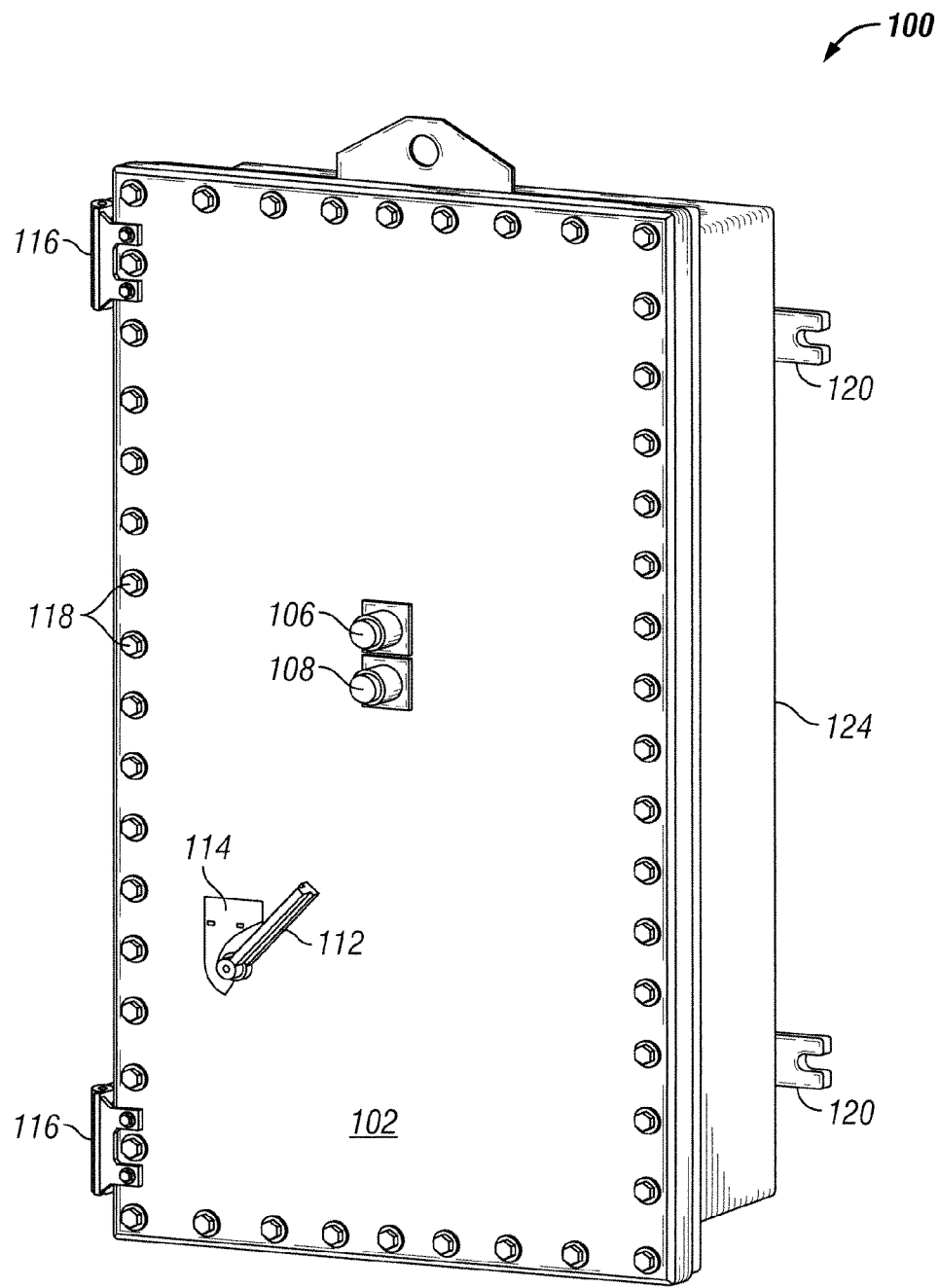
FIGS. 1 and 2 show explosion-proof enclosures in which one or more exemplary embodiments of a self-aligning actuator for a door-operated switch may be implemented.

Exemplary embodiments of a self-aligning actuator for a door-operated switch will now be described in detail with reference to the accompanying figures. Like elements in the various figures are denoted by like reference numerals for consistency.

In the following detailed description of exemplary embodiments of a self-aligning actuator for a door-operated switch, numerous specific details are set forth in order to provide a more thorough understanding of a self-aligning actuator for a door-operated switch. However, it will be apparent to one of ordinary skill in the art that a self-aligning actuator for a door-operated switch may be practiced without these specific details. In other instances, well-known features have not been described in detail to avoid unnecessarily complicating the description. Further, certain descriptions (e.g., top, bottom, side, end, interior, inside) are merely intended to help clarify aspects of a self-aligning actuator for a door-operated switch and are not meant to limit embodiments of a self-aligning actuator for a door-operated switch.

In general, exemplary embodiments of an actuator system provide systems, devices, and methods for using a self-aligning actuator for a door-operated switch mounted inside an explosion-proof enclosure. Specifically, exemplary embodiments of a self-aligning actuator for a door-operated switch provide for preventing a door of the explosion-proof enclosure from being opened when the switch is in a certain position because the self-aligning actuator remains engaged until the position of the switch changes. The actuator system described herein includes a handle assembly (including a handle and shaft) and a switch assembly (including a switch and a coupling body).

While the exemplary embodiments discussed herein are with reference to explosion-proof enclosures, other types of non-explosion-proof enclosures (e.g., junction boxes, control panels, lighting panels, motor control centers, switchgear cabinets, relay cabinets) or any other type of enclosure may be used in conjunction with exemplary embodiments of a self-aligning actuator for a door-operated switch. An enclosure may include a cover (also called a door) and an enclosure body, as described below.

A user may be any person that interacts with the explosion-proof enclosure or equipment controlled by one or more components of the explosion-proof enclosure. Specifically, a user may operate a switch handle (also merely called a handle) of a door-operated switch to change a position of the switch located inside the explosion-proof enclosure. As used herein, a handle may also be called an arm, an elongated arm, a knob, or any other suitable designation. A user may also, or in the alternative, open and/or close a door of an explosion-proof enclosure. Examples of a user may include, but are not limited to, an engineer, an electrician, an instrumentation and controls technician, a mechanic, an operator, a consultant, a contractor, and a manufacturer's representative.

In one or more exemplary embodiments, the switch located inside the explosion-proof enclosure is configured to control one or more components. A component may be associated with, and/or located within, the explosion-proof enclosure. A component may be a VFD, sensor, wiring, terminal, switch, handle, indicating light, duct, and/or other element.

In one or more exemplary embodiments, an explosion-proof enclosure (also known as a flame-proof enclosure) is an enclosure that is configured to contain an explosion that originates inside the enclosure. Further, the explosion-proof enclosure is configured to allow gases from inside the enclosure to escape across joints of the enclosure and cool as the gases exit the explosion-proof enclosure. The joints are also known as flame paths and exist where two surfaces meet and provide a path, from inside the explosion-proof enclosure to outside the explosion-proof enclosure, along which one or more gases may travel. A joint may be a mating of any two or more surfaces. Each surface may be any type of surface, including but not limited to a flat surface, a threaded surface, and a serrated surface.

In one or more exemplary embodiments, an explosion-proof enclosure is subject to meeting certain standards and/or requirements. For example, the National Electrical Manufactures Association (NEMA) sets standards by which an enclosure must comply in order to qualify as an explosion-proof enclosure. Specifically, NEMA Type 7, Type 8, Type 9, and Type 10 enclosures set standards by which an explosion-proof enclosure within a hazardous location must comply. For example, a NEMA Type 7 standard applies to enclosures constructed for indoor use in certain hazardous locations. Hazardous locations may be defined by one or more of a number of authorities, including but not limited to the National Electric Code (e.g., Class 1, Division I) and Underwriters' Laboratories, Inc. (e.g., UL 698). For example, a Class 1 hazardous area under the National Electric Code is an area in which flammable gases of vapors may be present in the air in sufficient quantities to be explosive.

As a specific example, NEMA standards for an explosion-proof enclosure of a certain size or range of sizes may require that in a Group B, Division 1 area, any flame path of an explosion-proof enclosure must be at least 1 inch long (continuous and without interruption), and the gap between the surfaces cannot exceed 0.0015 inches. Standards created and maintained by NEMA may be found at www.nema.org/stds and are hereby incorporated by reference.

Figure 2:
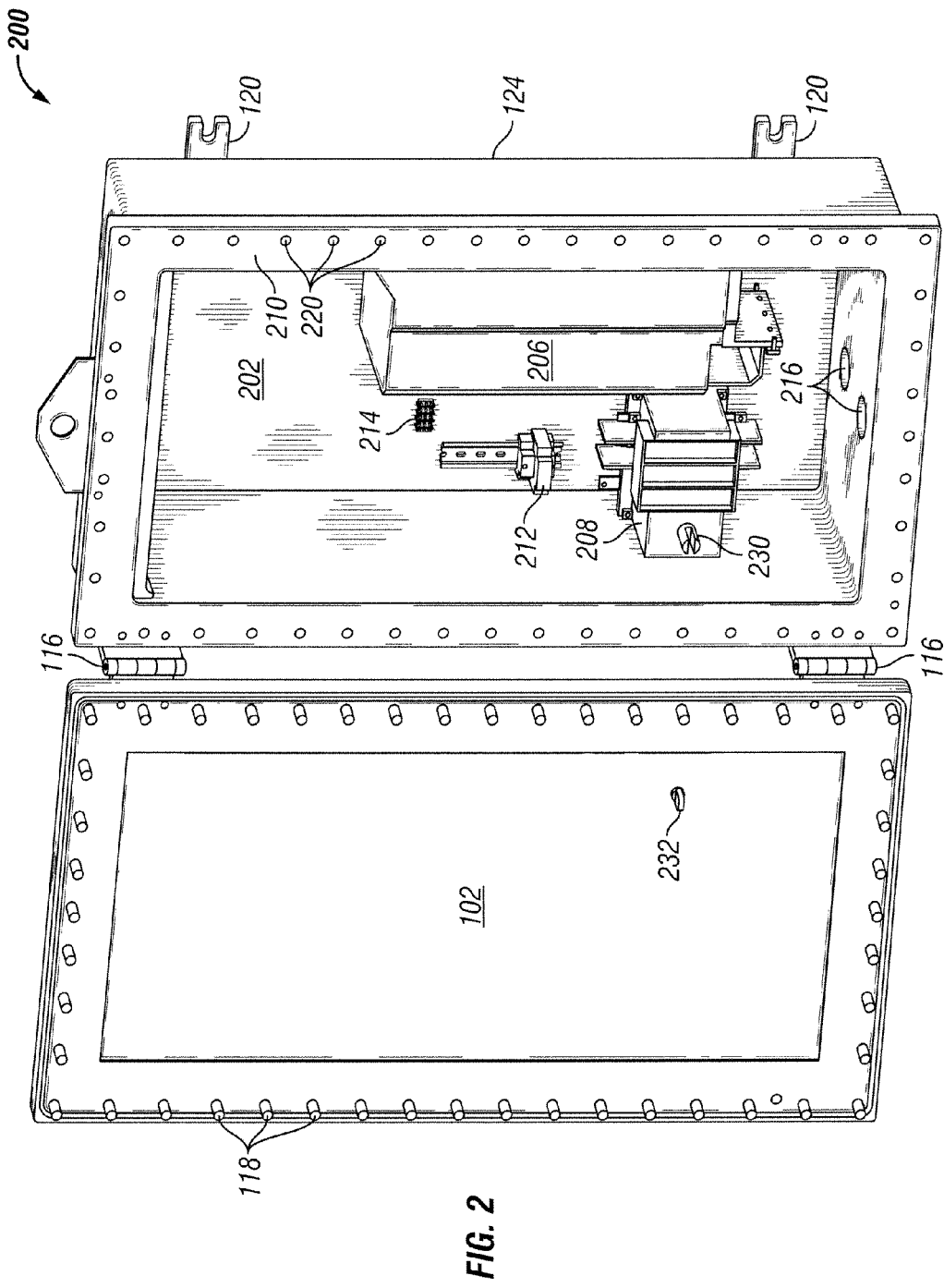

FIGS. 1 and 2 depict an explosion-proof enclosure 100 in which one or more exemplary embodiments of a self-aligning actuator for a door-operated switch may be implemented. In one or more exemplary embodiments, one or more of the components shown in FIGS. 1 and 2 may be omitted, repeated, and/or substituted. Accordingly, exemplary embodiments of an explosion-proof enclosure should not be considered limited to the specific arrangements of components shown in FIGS. 1 and 2.

Referring now to FIG. 1, an example of an explosion-proof enclosure 100 in a closed position is shown. The enclosure cover 102 is secured to the enclosure body 124 by a number of fastening devices 118 located at a number of points around the perimeter of the enclosure cover 102. In one or more exemplary embodiments, a fastening device 118 may be one or more of a number of fastening devices, including but not limited to a bolt (which may be coupled with a nut), a screw (which may be coupled with a nut), and a clamp. In addition, one or more hinges 116 are secured to one side of the enclosure cover 102 and a corresponding side of the enclosure body 124 so that, when all of the fastening devices 118 are removed, the enclosure cover 102 may swing outward (i.e., an open position) from the enclosure body 124 using the one or more hinges 116. In one or more exemplary embodiments, there are no hinges, and the enclosure cover 102 is separated from the enclosure body 124 when all of the fastening devices 118 are removed.

The enclosure cover 102 and the enclosure body 124 may be made of any suitable material, including metal (e.g., alloy, stainless steel), plastic, some other material, or any combination thereof. The enclosure cover 102 and the enclosure body 124 may be made of the same material or different materials.

In one or more exemplary embodiments, on the end of the enclosure body 124 opposite the enclosure cover 102, one or more mounting brackets 120 are affixed to the exterior of the enclosure body 124 to facilitate mounting the enclosure 100. Using the mounting brackets 120, the enclosure 100 may be mounted to one or more of a number of surfaces and/or components, including but not limited to a wall, a control cabinet, a cement block, an I-beam, and a U-bracket.

The enclosure cover 102 may include one or more features that allow for user interaction while the enclosure 100 is sealed in the closed position. As shown in FIG. 1, one or more indicating lights (e.g., indicating light 1 106, indicting light 2 108) may be located on the enclosure cover 102. Each indicating light may be used to indicate a status of a feature or process associated with equipment inside the enclosure 100. For example, an indicating light may show a constant green light if a motor controlled by a VFD inside the enclosure 100 is operating. As another example, an indicating light may flash red when a motor controlled by a VFD inside the enclosure 100 has a problem (e.g., tripped circuit, VFD overheats, overcurrent situation). As another example, an indicating light may show a constant red light when an electromagnetic pulse caused by an explosion inside the enclosure 100 has resulted. An indicating light may be made of one or more materials (e.g., glass, plastic) using one or more different lighting sources (e.g., light-emitting diode (LED), incandescent bulb).

In one or more exemplary embodiments, the enclosure cover 102 may also include a handle 112 that allows a user to operate a switch (not shown) located inside the explosion-proof enclosure 100 while the explosion-proof enclosure 110 is closed. Those skilled in the art will appreciate that the handle 112 may be used for any type of switch. Each position (e.g., OFF, ON, HOLD, RESET) of the switch may be indicated by a switch position indicator 114 positioned adjacent to the handle 112 on the outer surface of the enclosure cover 102. A switch associated with the handle 112 and the switch position indicator 114 may be used to electrically and/or mechanically isolate, and/or change the mode of operation of, one or more components inside or associated with the explosion-proof enclosure 100. For example, the handle 112 may point to "OFF" on the switch position indicator 114 when a disconnect switch located inside the explosion-proof enclosure 100 is disengaged. In such a case, all equipment located inside the explosion-proof enclosure 100, as well as the equipment (e.g., a motor) controlled by the equipment located inside the explosion-proof enclosure 100, may be without power.

Referring now to FIG. 2, an example of an explosion-proof enclosure 100 in an open position in accordance with one or more exemplary embodiments is shown. The explosion-proof enclosure 100 is in the open position because the enclosure cover (not shown) is not secured to the enclosure body 124. The hinges 116 attached to the left side of the enclosure body 124 are also attached to the left side of the enclosure cover, which is swung outward from the enclosure body 124. Because the explosion-proof enclosure 100 is in the open position, the components of the explosion-proof enclosure 100 are visible to a user.

As described above with respect to FIG. 1, the enclosure body 124 includes two or more mounting brackets 120. In addition, in one or more exemplary embodiments, the enclosure body 124 includes an enclosure engagement surface 210, against which the enclosure cover meets when the explosion-proof enclosure 100 is in the closed position. A number of fastening device apertures 220 are shown around the enclosure engagement surface 210, where each of the fastening device apertures 220 are configured to receive a fastening device 118 that traverses through the enclosure cover 102, as described above with respect to FIG. 1. The number of fastening device apertures 220 may vary, depending on one or more of a number of factors, including but not limited to the size of the fastening device apertures 220, a standard that the explosion-proof enclosure 100 meets, and the type of fastening device 118 used. The number of fastening device apertures 220 may be zero.

In one or more exemplary embodiments, the explosion-proof enclosure 100 of FIG. 2 includes a mounting plate 202 that is affixed to the back of the inside of the explosion-proof enclosure 100. The mounting plate 202 may be configured to receive one or more components such that the one or more components are affixed to the mounting plate 202. The mounting plate 202 may include one or more apertures configured to receive securing devices that may be used to affix a component to the mounting plate 202. The mounting plate 202 may be made of any suitable material, including but not limited to the material of the enclosure body 124. In one or more exemplary embodiments, some or all of the one or more components may be mounted directly to an inside wall of the explosion-proof enclosure 100 rather than to the mounting plate 202.

In one or more exemplary embodiments, a VFD 206 is affixed to the mounting plate 202 inside the explosion-proof enclosure 100. The VFD 206 may include any components used to drive a motor and/or other device using variable control signals for controlled starts, stops, and/or operations of the motor and/or other devices. Examples of components of a VFD include, but are not limited to, discrete relays, a programmable logic controller (PLC), a programmable logic relay (PLR), an uninterruptible power supply (UPS), and a distributed control system (DCS). In one or more exemplary embodiments, one or more components of the VFD may replace the VFD. For example, the VFD may be substituted by one or more PLCs, one or more PLRs, one or more UPSs, one or more DCSs, and/or other heat-generating components.

In one or more exemplary embodiments, a switch 208 is affixed to the mounting plate 202 inside the explosion-proof enclosure 100. The switch 208 may be configured to electrically and/or mechanically isolate, and/or change the mode of operation of, one or more components located inside the explosion-proof enclosure 100 and/or one or more components located outside the explosion-proof enclosure 100. The switch 208 may be any type of switch, including but not limited to a disconnect switch, a test switch, a reset switch, an indicator switch, and a relay switch. For example, the switch 208 may be a disconnect switch that is used to cut off power to all components in the explosion-proof enclosure 100 and all devices located outside the explosion-proof enclosure 100 that are controlled by the components inside the explosion-proof enclosure 100. As another example, the switch 208 may be a bypass switch that is used to deactivate a protection scheme (e.g., a relay) or some other particular component or group of components located inside the explosion-proof enclosure 100.

The switch 208 may further be configured to receive, through mechanical and/or electrical means, a directive to change states (e.g., open, closed, hold) from a component located on the enclosure cover. For example, if the enclosure cover includes a handle (as described above with respect to FIG. 1), then a switch handle shaft (also merely called a shaft) 232 may extend from the handle through the enclosure cover to a switch coupling 230 of the switch 208. When the explosion-proof enclosure 100 is in the closed position, the shaft 232 couples with the switch coupling (also merely called a coupling) 230, and switch 208 may be operated by operating the handle located outside the explosion-proof enclosure, as described above with respect to FIG. 1.

In one or more exemplary embodiments, one or more relays (e.g., relay 212) are affixed to the mounting plate 202 inside the explosion-proof enclosure 100. A relay 212 may be configured to control one or more operations of one or more components located in, or associated with, the explosion-proof enclosure 100. Specifically, a relay 212 may, through one or more relay contacts, allow electrical current to flow and/or stop electrical current from flowing to one or more components in the enclosure 100 based on whether a coil of the relay 212 is energized or not. For example, if the coil of the relay 212 is energized, then a contact on the relay may be closed to allow current to flow to energize a motor. The relay 212 may be activated based on a timer, a current, a voltage, some other suitable activation method, or any combination thereof. The relay 212 may also be configured to emit a signal when a condition has occurred. For example, the relay 212 may flash a red light to indicate that the VFD 206 is in an alarm state.

In one or more exemplary embodiments, wiring terminals 214 are affixed to the mounting plate 202 inside the explosion-proof enclosure 100. Wiring terminals 214 are a series of terminals where one terminal is electrically connected to at least one other terminal in the series of terminals while remaining electrically isolated from the remaining terminals in the series of terminals. In other words, two or more terminals among the series of terminals act as a junction point where multiple wires may be electrically connected through the joined terminals.

In one or more exemplary embodiments, one or more entry holes 216 may extend through one or more sides (e.g., bottom) of the enclosure body 124. Each entry hole 216 may be configured to allow cables and/or wiring for power, control, and/or communications to pass through from outside the explosion-proof enclosure 100 to one or more components inside the explosion-proof enclosure 100. An entry hole 216 may be joined with a conduit and coupling from outside the explosion-proof enclosure 100 to protect the cables and/or wiring received by the entry hole 216 and to help maintain the integrity of the explosion-proof enclosure 100 through the entry hole 216.

Figure 3A:
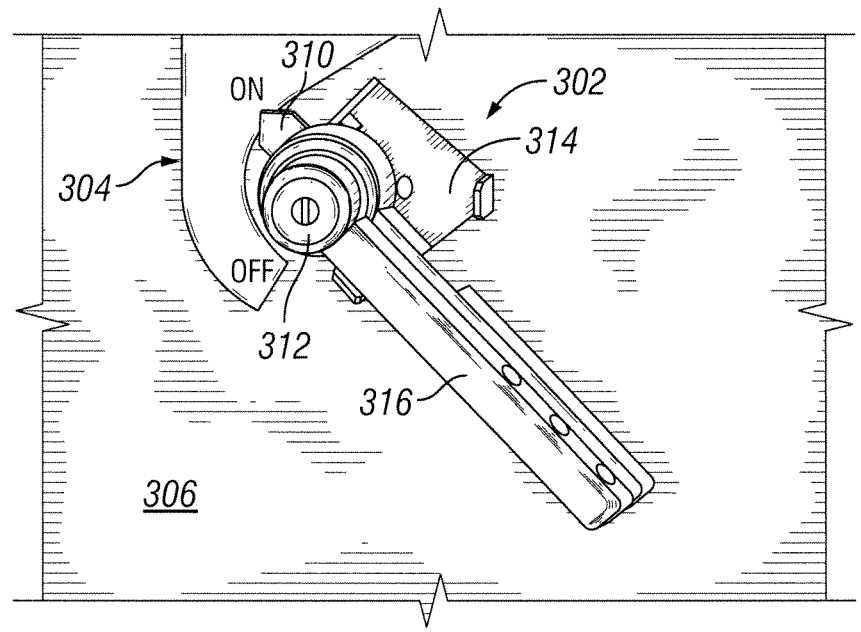
FIGS. 3A and 3B show various examples of a handle and a switch position indicator in accordance with one or more exemplary embodiments of a self-aligning actuator for a door-operated switch.
Figure 3B:
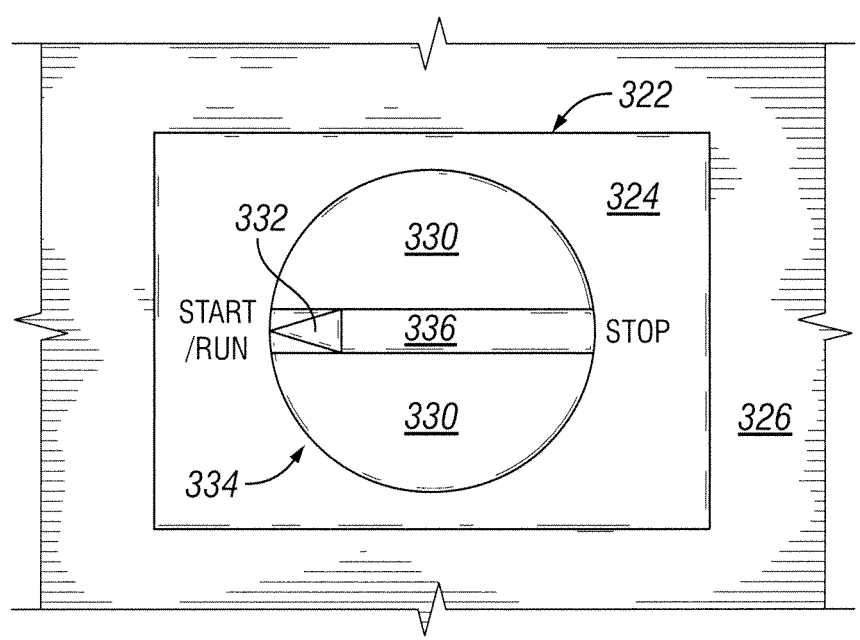

FIGS. 3A and 3B show various examples of a handle assembly in accordance with one or more exemplary embodiments of a self-aligning actuator for a door-operated switch. In each case, the handle assemblies shown in FIGS. 3A and 3B are mounted on the outside of an explosion-proof enclosure. Each of these handle assemblies is described below. Exemplary embodiments of handle assemblies for a self-aligning actuator for a door-operated switch are not limited to the configurations shown in FIGS. 3A and 3B and discussed herein.

FIG. 3A shows a frontal view of handle assembly 302 mounted on a surface 306 (e.g., a door) of an explosion-proof enclosure. The handle assembly 302 shown in FIG. 3A includes an elongated arm 316 that is used to rotate a pointer 310 around an axis secured by a fastening device 312. The elongated arm 316 (also generally called a handle) may be coupled to and aligned with the pointer 310, as shown in FIG. 3A. The pointer 310 points to two or more designations listed on the switch position indicator 304.

In one or more exemplary embodiments, the switch position indicator 304 remains stationary and affixed to the surface 306 of the explosion-proof enclosure, adjacent to the pointer 310. The switch position indicator may include a number of designations, where each designation corresponds to a position of the switch. In this example, the switch position indicator 304 includes two designations of "ON" and "OFF," which correspond to "ON" and "OFF" switch positions of a switch (not shown). In such a case, the switch may be a disconnect switch.

The range of motion of the elongated arm 316 (and thus the pointer 310) may be limited by a guard 314. The guard 314 may be coupled between the surface 306 and the elongated arm 316/pointer 310 using the fastening device 312. In this example, the guard 314 limits the range of motion of the elongated arm 316 to approximately 90°. The limits on the range of motion of the elongated arm 316 may correspond to the two positions (or the two end positions, if there are more than two positions) of the corresponding switch located inside the explosion-proof enclosure.

FIG. 3B shows a frontal view of a handle assembly 322 mounted on a surface 326 (e.g., a door) of an explosion-proof enclosure. The handle assembly 322 shown in FIG. 3B includes a knob 334 (also generally called a handle) that has a base 330 and a raised portion 336. The raised portion 336 of the knob 334 is configured to allow a user to turn the knob 334 of the handle assembly 322. The raised portion 336 of the knob 334 includes a pointer 332, which points to two or more designations listed on the switch position indicator 324. The switch position indicator 324 remains stationary and affixed to the surface 306 of the explosion-proof enclosure. In this example, the switch position indicator 324 includes two designations of "START/RUN" and "STOP."

As described above with respect to FIG. 3A, the range of motion of the knob 334 (and thus the pointer 332) in FIG. 3B may be limited. While there is no guard of similar component visible on the surface 326 of the explosion-proof enclosure, the range of motion of the knob 334 may be limited by a guard located inside the base 330 or coupled to the knob 334 on the surface 326 inside the explosion-proof enclosure. In this example, the range of motion of the knob 334 is approximately 180°. The limits on the range of motion of the knob 334 may correspond to the two positions (or the two end positions, if there are more than two positions) of the corresponding switch located inside the explosion-proof enclosure.

In one or more exemplary embodiments, a flame path is formed where the handle assembly 322 (or components coupled thereto) traverses an aperture in the wall of the explosion-proof enclosure. For each handle assembly shown in FIGS. 3A and 3B, the materials (e.g., plastic, metal, wood, rubber, a composite material, fiberglass) used for the various components (e.g., knob, elongated arm, pointer, guard) are suitable for maintaining the integrity of an explosion-proof enclosure while also retaining functional reliability for the task performed by such component. Further, for each handle assembly shown in FIGS. 3A and 3B, some or all of the handle assembly may be fixedly coupled to the surface and/or aperture of the explosion-proof enclosure using one or more coupling techniques, including but not limited to bolting, welding, mating threads, using epoxy, brazing, press fitting, mechanically connecting, using a flat joint, and using a serrated joint.

FIG. 4 shows an exploded view of a handle assembly 400 of an actuator system for a self-aligning actuator for a door-operated switch in accordance with one or more exemplary embodiments. The switch assembly 400 shown in FIG. 4 is described below. Features, elements, and/or components shown but not described and/or labeled in FIG. 4 are described and/or labeled above with respect to FIGS. 3A and 3B. Exemplary embodiments of a self-aligning actuator for a door-operated switch are not limited to the configurations shown in FIG. 4 and discussed herein.

A pointer 410, fastening device 412, guard 414, and elongated arm 416, substantially similar to the keypad of FIG. 3A, are shown in FIG. 4. Between the pointer 410 and the guard 414, hidden from view when the handle assembly 400 is assembled, is a bearing 440, which traverses the large apertures in the guard 414, spring return plate 442, spring 444, and door of the explosion-proof enclosure (not shown).

One end of the handle shaft 450 is coupled to a handle (in this case, the elongated arm 416) of the handle assembly. Specifically, one end of the handle shaft 450 is coupled to the sealing device 446 and is received into the bottom end of the bearing 440 to complete the handle assembly 400. The other end of the handle shaft 450 is coupled to a male coupling element 452. The male coupling element 452 is configured to couple to a female coupling element (described below) of the switch assembly (described below).

In one or more exemplary embodiments, when the handle (in this example, the elongated arm 416) is rotated about the axis formed using the fastening device 412, the handle shaft 450, and in particular the male coupling element 452, rotates in a corresponding manner. When the handle assembly is coupled to the switch assembly, the handle shaft 450 and the rest of the handle assembly may move among two or more positions that correspond to each position of the switch (defined below).

The handle shaft 450 of the handle assembly 400 may be configured in one of a number of different ways. Specifically, the male coupling element 452 may have one of a number of different configurations. Examples of the shape of the male coupling element 452 may include, but are not limited to, squared, rounded, slotted, angled, and planar. The handle shaft 450, including the male coupling element 452, may be made of one or more materials (e.g., metal, plastic) suitable to withstand the operating conditions (e.g., torque, temperature, pressure) that may exist inside an explosion-proof enclosure when a switch position is changed using exemplary embodiments.

FIG. 5 shows an exploded view of switch assembly 500 of an actuator system in accordance with one or more exemplary embodiments. The switch assembly 500 includes a coupling body 529 that includes a female coupling element 530 and a switch shaft 531. In one or more exemplary embodiments, the switch shaft 531 of the coupling body 529 is inserted into the coupling receiver 534 to couple to and engage the switch 532. One end of the female coupling element 530 may be configured to couple to the male coupling element of the shaft of the handle assembly. The other end of the female coupling element 530 may include a shaft that is configured to couple to and engage the switch 532. The female coupling element 530 also rotates as the switch 532 moves from one position to another position.

The female coupling element 530 may have one of a number of different configurations. Specifically, the female coupling element 530 may be configured to complement the shape of the male coupling element of the shaft of the handle assembly. Examples of the shape of the female coupling element 530 may include, but are not limited to, squared, rounded, slotted, angled, and planar. For example, the female coupling element 530 may have a slotted portion as well as an angled terminus (upper lip) that aligns, as the shaft couples to the coupling body, a male coupling element with the slotted portion of the female coupling element 530.

The coupling body 529, including the female coupling element 530, may be made of one or more materials (e.g., metal, plastic) suitable to withstand the operating conditions (e.g., torque, temperature, pressure) that may exist inside an explosion-proof enclosure when a switch position is changed using exemplary embodiments.

FIGS. 6A-6D show a cross-sectional side view of an actuator system 600 that includes a self-aligning actuator for a door-operated switch in accordance with one or more exemplary embodiments. The exemplary actuator system 600 shown in FIGS. 6A-6D are described below. Features shown but not described and/or labeled in FIGS. 6A-6D are described and/or labeled above with respect to FIGS. 1 through 5. Exemplary embodiments of an actuator system are not limited to the configurations shown in FIGS. 6A-6D and discussed herein.

Generally stated, the handle shaft 650 of the handle assembly traverses an opening in the door 607 (also called a cover) of the enclosure. Further, the switch 632 and the coupling body are positioned within the enclosure, and the handle (elongated arm 616 in FIGS. 6A-6D) is located on the outer surface of the door 607 outside the enclosure. The actuator system 600 shown in FIG. 6A and FIG. 6C includes a handle assembly that is mounted on the surface 606 of the door 607 outside the explosion-proof enclosure. Specifically, the handle assembly includes a fastening device 612, guard 614, and elongated arm 616, substantially similar to the corresponding components described above with respect to FIG. 3A. The handle assembly also includes a bearing 640, a handle shaft 650, and a male coupling element 652, substantially similar to the corresponding components described above with respect to FIG. 4.

The actuator system 600 also includes a switch assembly, which includes a coupling body 629 and a switch 632. The coupling body 629 includes a female coupling element 630 and a coupling shaft 631 that couples to the switch 632. The components of the switch assembly in FIGS. 6A-6D are substantially similar to the corresponding components described above with respect to FIG. 5.

When the door 607 is not closed, the switch 632 is in the "open" position. In one or more exemplary embodiments, one or more safety features (e.g., mechanical devices, electronic locking mechanisms) are incorporated with the switch 632 so that the switch must be in the "open" position when the door 607 is not closed. For example, a torsional spring may be incorporated into the handle assembly to position the handle in a position substantially close to the "off" position (or some other predetermined position). In such a case, the torsional spring may be used in conjunction with the self-alignment feature described above to reduce the amount of wear on the components of the handle assembly and the switch assembly as the door is closed (the handle assembly aligns with the switch assembly) a number of times.

Figure 6A:
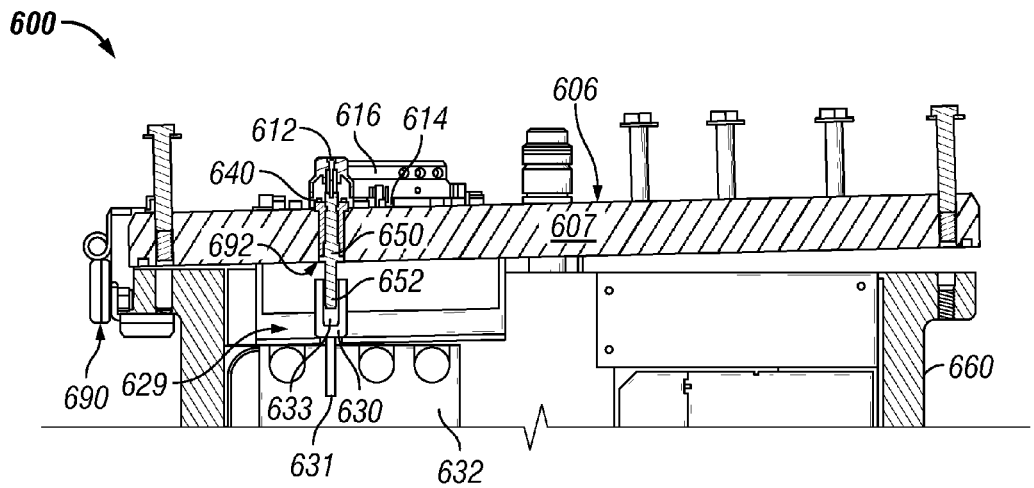
FIGS. 6A-6D show a side view of an actuator system that includes a self-aligning actuator for a door-operated switch in accordance with one or more exemplary embodiments.

In FIG. 6A, the door 607 is hingedly coupled to the enclosure body 660 by one or more hinges 690 located on one side (in this example, the left side) of the enclosure body 660. As shown in FIG. 6A, the door 607 to the explosion-proof enclosure is slightly ajar from the enclosure body 660 of the explosion-proof enclosure. In this case, the door 607 is about to be closed (i.e., coupled to the enclosure body 660 of the explosion-proof enclosure). Thus, the handle shaft 650 (and specifically the male coupling element 652) of the handle assembly is coupled to the coupling body 629 (and specifically the female coupling element 630) of the switch assembly. The female coupling element 630 in this case has a slotted portion 633, substantially similar to the slotted portion 633 of the female coupling element described above with respect to FIG. 5. Here, the slotted portion 633 extends across the width of the female coupling element 630 and continues down most of the length of the female coupling element 630.

As the male coupling element 652 in FIG. 6A approaches the female coupling element 630, the terminus (top edge) of the female coupling element 630 aligns the male coupling element 652 (and thus the handle shaft 650 and the corresponding handle assembly) to the "open" position. Thus, as the door 607 continues to close, the male coupling element 652 is oriented properly to slide within and toward the bottom of the slotted portion 633 of the female coupling element 630. For this to occur, the fastening devices 662 must be removed or withdrawn, as shown in FIG. 6A, so as not to engage both the door 607 and the body 660 of the explosion-proof enclosure.

Figure 6B:
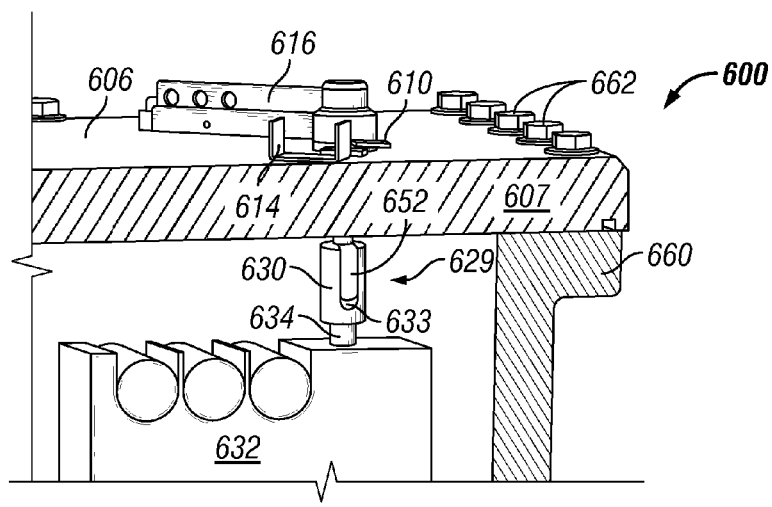

When the door 607 is closed against (coupled to) the enclosure body 660, as shown in FIG. 6B, the fastening devices 662 (e.g., bolts) can couple the door 607 to the body 660 of the explosion-proof enclosure. Further, the male coupling element 652 is positioned within and toward the bottom of the slotted portion 633 of the female coupling element 630. In this case, as the handle assembly rotates, the switch 632 changes position (e.g., from "open" to "closed") based on the coupling of the handle shaft 650 to the coupling body 629 (or, more specifically, the coupling of the male coupling element 652 to the slotted portion 633 of the female coupling element 630). In other words, the slotted portion 633 of the female coupling element 630 receives and engages the male coupling element 652 when the handle shaft 650 is coupled to the coupling body 629.

Figure 6C:
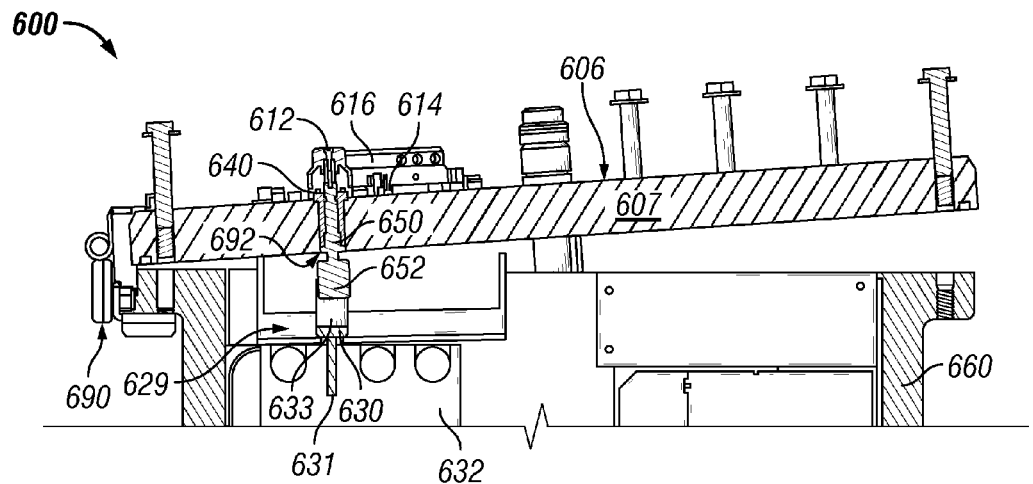
Figure 6D:
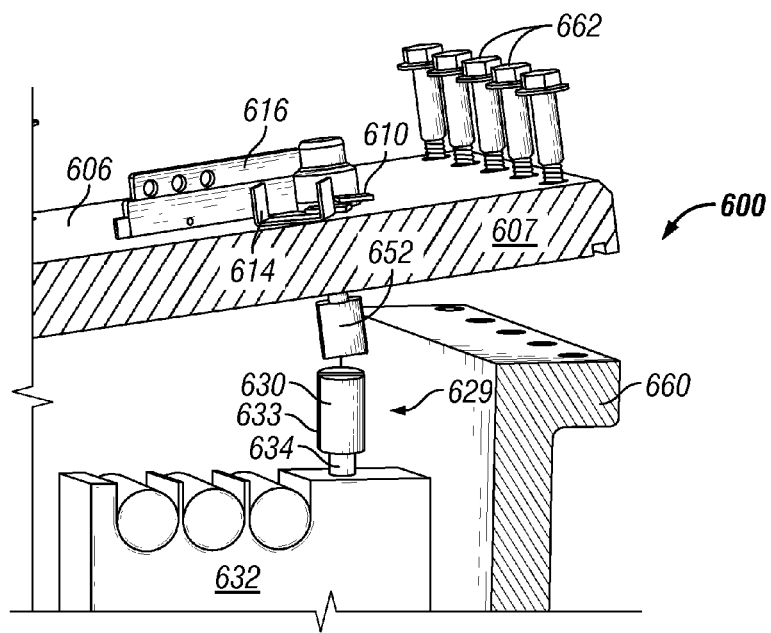

In one or more exemplary embodiments, when the door 607 is closed, the axis of the handle assembly (i.e., along the length of the shaft) is not linear with or parallel to the axis of the switch assembly (i.e., along the length of the female coupling element). In such a case, when the elongated arm 616 is rotated (thus changing the position of the handle shaft 650, the coupling body 629, and the switch 632 from the "open" position to another position), the non-linear alignment of the shaft and the coupling body 629 causes the male coupling element 652 to remain fixedly coupled to the coupling body 629. Further, or in the alternative, as shown in FIGS. 6C and 6D, the arced path the door 607 takes when the door opens from the enclosure body 660 due to the hinged connection on one side of the enclosure body 660 between the door 607 and the enclosure body 660 allows the male coupling element 652 to decouple from the coupling body 629 when the male coupling element 652 and the coupling body 629 are oriented in a specific position (e.g., coinciding with the switch in the open position).

In other words, as shown in FIG. 6A, when the shaft 650 is coupled to the coupling body 629 and when the fastening devices 662 are removed or sufficiently withdrawn, the slotted portion 633 of the female coupling element 630 prevents the male coupling element 652 from disengaging from the slotted portion 633 when the handle shaft 650, the coupling body 629, and the switch 632 are in a position other than the "open" position. Thus, the cover 607 of the enclosure cannot be opened (separated from the enclosure body 660) when the handle (elongated arm 616) is in the "closed" position. Similarly, in one or more exemplary embodiments, when the handle shaft 650 is coupled to the coupling body 629, the slotted portion 633 of the female coupling element 630 allows the male coupling element 652 to disengage from the slotted portion 633 when the handle shaft 650, the coupling body 629, and the switch 632 are in the "open" position, as shown in FIGS. 6C and 6D.

The male coupling element 652 and/or coupling body 629 may have one or more features, either in addition to or instead of one or more features described above, that are used to prevent the male coupling element 652 from disengaging from the slotted portion 633 when the shaft, the coupling body, and the switch 632 are in a position other than the "open" position and/or to allow the male coupling element 652 to disengage from the slotted portion 633 when the handle shaft 650, the coupling body 629, and the switch 632 are in the "open" position. For example, as described more fully with respect to FIGS. 9A through 9C below, the male coupling element may include a slot formed therein, and the female coupling element may further include a pin extending orthogonally therefrom. In such a case, when the shaft is coupled to the coupling body, the pin may be positioned within the slot when the shaft, the coupling body, and the switch are in the closed position, and the pin may be positioned outside the slot when the shaft, the coupling body, and the switch are in the open position.

As another example, the male coupling element may have a linear slot formed therein, and the female coupling element may further include a protruding linear component extending orthogonally therefrom that corresponds to the dimensions of the linear slot of the male coupling element. In such a case, when the shaft is coupled to the coupling body, the protruding linear component may be positioned within the linear slot when the shaft, the coupling body, and the switch are in the closed position. Further, the protruding linear component may be disengaged from the linear slot when the shaft, the coupling body, and the switch are in the open position.

In one or more exemplary embodiments, a flame path (e.g., flame path 692 in FIG. 6A) is formed between the bearing 640 and the wall of the aperture in the door 607. In other words, the gap between the bearing 640 and the wall of the aperture in the door 607 is tight enough so as to cool combustible gases while exiting from inside the explosion-proof enclosure. One or more other flame paths may exist, in place of or in addition to the flame path 692 discussed above, at other locations in and around the switch assembly.

Figure 7:
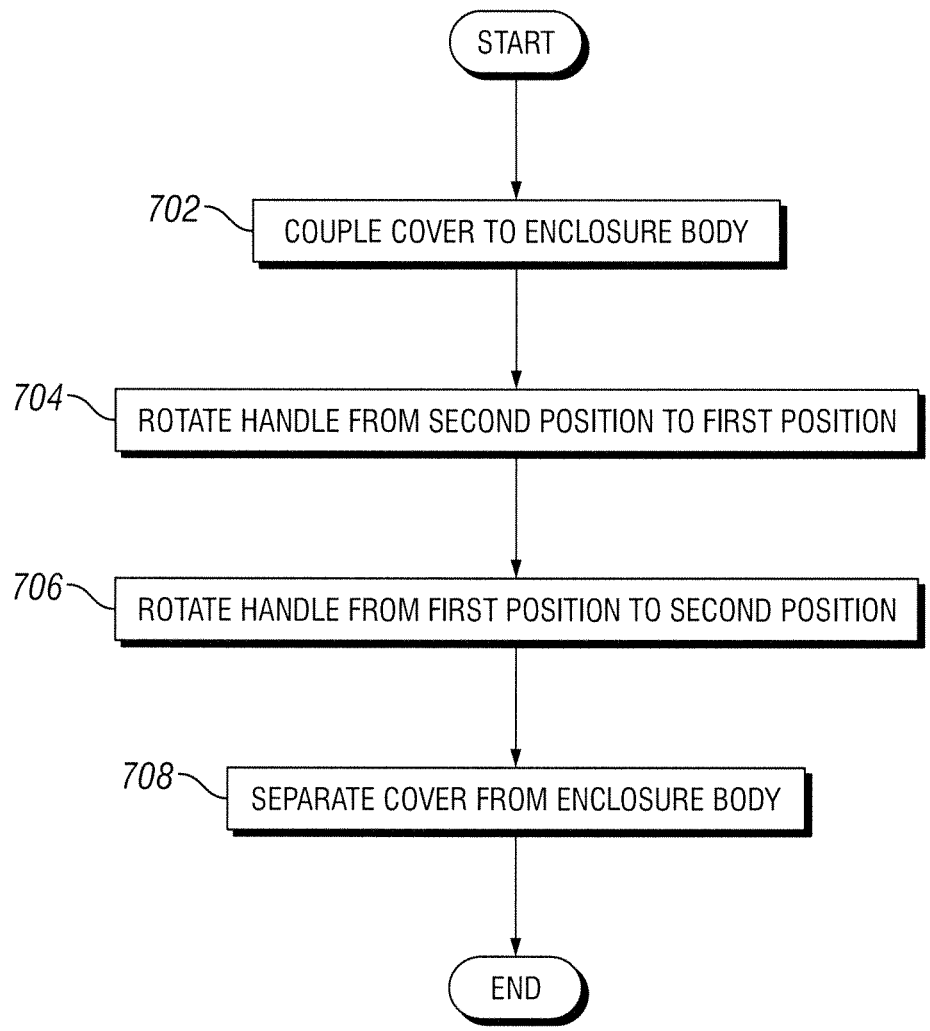
FIG. 7 shows a flowchart of a method for operating a switch using a self-aligning actuator for a door-operated switch in accordance with one or more exemplary embodiments.

FIG. 7 shows a flowchart of a method for operating a switch located inside an explosion-proof enclosure in accordance with one or more exemplary embodiments. While the various steps in this flowchart are presented and described sequentially, one of ordinary skill will appreciate that some or all of the steps may be executed in different orders, may be combined or omitted, and some or all of the steps may be executed in parallel. Further, in one or more of the exemplary embodiments of the invention, one or more of the steps described below may be omitted, repeated, and/or performed in a different order. In addition, a person of ordinary skill in the art will appreciate that additional steps, omitted in FIG. 7, may be included in performing this method. Accordingly, the specific arrangement of steps shown in FIG. 7 should not be construed as limiting the scope of the invention.

In Step 702, a cover is coupled to an enclosure body. In one or more exemplary embodiments, the cover includes a handle, which is mounted on an outer surface of the cover. The cover may be coupled to the enclosure body using a plurality of fastening devices that traverse a plurality of fastening device apertures along a perimeter of the cover and an outer surface of the enclosure body. The cover may further be hingedly coupled to the enclosure body by one or more hinges located on one side of the enclosure body. The handle may be part of a handle assembly that also includes a shaft having a first shaft end portion for coupling to the handle and a second shaft end portion. The shaft may traverse an opening in the cover, where the switch and a coupling body are positioned within the enclosure body.

The second shaft portion of the shaft may include a male coupling element that aligns with a female coupling element of a first coupling end portion of a coupling body of a switch assembly. The coupling body may include a second coupling end portion for engaging the switch. The female coupling element may include a slotted portion and an angled terminus.

The angled terminus of the female coupling element may align, using the male coupling element, the shaft to one of a number of positions as the shaft couples to the coupling body. For example, as the cover is coupled to the enclosure body, the male coupling element may contact the angled terminus of the female coupling element. In such a case, as the cover continues to move closer to the enclosure body, the angled terminus rotates the male coupling element so that the male coupling element aligns with the slotted portion of the female coupling element. The slotted portion of the female coupling element may receive and engage the male coupling element of the second shaft end portion after the angled terminus aligns the shaft and when the shaft is coupled to the coupling body.

In one or more exemplary embodiments, the switch is in one position (e.g., an open position) when the cover is coupled to the enclosure body. The handle may be in any position when the cover is coupled to the enclosure body. While the cover is coupled to the enclosure body, the handle is aligned to the corresponding position of the switch using the angled terminus of the female coupling element and the male coupling element.

Once the cover is coupled to the enclosure body, the position of the handle corresponds to the position of the switch. In one or more exemplary embodiments, a switch position indicator may be affixed to the outer surface of the cover adjacent to the handle. The switch position indicator may include a number of designations that correspond to the switch positions. When the cover is coupled to the enclosure body, the resulting enclosure may be an explosion-proof enclosure.

In Step 704, the handle is rotated from a second position to a first position. Once the cover is coupled to the enclosure body, the slotted portion may prevent the male coupling element from disengaging when the shaft and the coupling body (and so also the switch) are in one or more predetermined positions. In one or more embodiments, the first position of the handle corresponds to a closed switch position, and wherein the second position of the handle corresponds to an open switch position. For example, if the switch is rotated from an open position (a second position) to a closed position (a first position), then the slotted portion prevents the male coupling element from disengaging. The cover may not be separated from the enclosure body when the handle is in the first position.

In one or more exemplary embodiments, the male coupling element may also include a slot formed therein. Further, the female coupling element further may include a pin extending orthogonally therefrom. In such a case, the pin may be positioned within the slot when the handle is in the first position. Further, the pin may be positioned outside the slot when the handle is in the second position.

In Step 706, the handle is rotated from the first position to the second position. In one or more exemplary embodiments, the slotted portion disengages the male coupling element when the shaft and the coupling body (and so also the switch) are in the second position. For example, if the second position of the switch is an open position, then the slotted portion disengages the male coupling element.

In Step 708, the cover is separated from the enclosure body. In one or more exemplary embodiments, the cover separates from the enclosure body when the plurality of fastening devices are removed from the plurality of fastening device apertures and when the handle is in the second position. In one or more exemplary embodiments, the switch is a disconnect switch, where the switch positions include an open position and a closed position, and wherein the designations on the switch position indicator include on and off. In such a case, the first position corresponds to a closed switch position and an on switch position indicator designation, and the second position corresponds to an open switch position and an off switch position indicator designation.

The following description (in conjunction with FIGS. 1 through 7) describes a few examples in accordance with one or more exemplary embodiments. The examples are for an actuator system for operating a switch located inside an explosion-proof enclosure. Terminology used in FIGS. 1 through 7 may be used in the example without further reference to FIGS. 1 through 7.

Example 1

Consider the following example, shown in FIGS. 8A through 8F, which describes an actuator system 800 in accordance with one or more exemplary embodiments described above. FIG. 8A shows a side view of a portion of a handle assembly and a switch assembly. Specifically, the portion of the handle assembly shown in FIGS. 8A through 8F include a handle shaft 850, where the handle shaft 850 includes a male coupling element 852. The portion of the switch assembly shown in FIGS. 8A through 8F includes a coupling body 829, which includes a switch shaft 834 and a female coupling element 830. The female coupling element 830 has a slotted portion 833 (shown in FIG. 8E) that has a depth and a width. The slotted portion 833 originates at the top end of the female coupling element 830 and runs along the width of the female coupling element 830. Further, the top end of the female coupling element 830 includes an angled terminus 831 (upper lip) that, in this case, slopes slightly from the top of the female coupling element 830 toward the bottom of the female coupling element 830. As described above, the angled terminus 831 is configured to align, as the handle shaft 850 couples to the female coupling element 830, the male coupling element 852 with the slotted portion 833 of the female coupling element 830.

The coupling body 829 also includes a switch shaft 834 that is configured to engage and couple to the switch. The switch shaft 834 is fixedly coupled to the coupling body 829, so that as the coupling body 829 rotates (as may be caused by rotating the handle (not shown) of the handle assembly when the handle shaft 850 is coupled to the coupling body 829) along its vertical axis, the switch shaft 834 likewise rotates along its vertical axis. As the switch shaft 834 rotates, the position of the switch (not shown) changes.

The male coupling element 852 has a width, shown in FIG. 8A. As shown in FIG. 8A, the handle shaft 850 (and more specifically the male coupling element 852) is not aligned with the slotted portion of the female coupling element 830. For example, the switch of the switch assembly may be in the open position, while the handle of the handle assembly may be in the closed position. Further, as shown in FIGS. 8A through 8E, the vertical axis of the coupling body 829 is substantially parallel to and substantially in line with the vertical axis of the handle shaft 850. One or more hinges (not shown) are located on one side of the enclosure body (not shown) and are used to hingedly couple the door (not shown) to the enclosure body. In this example, the one or more hinges are located on the left side of each of FIGS. 8A through 8E.

In FIG. 8B, the handle shaft 850 of the handle assembly is beginning to couple to the coupling body 829 of the switch assembly. As a result, as the male coupling element 852 of the handle assembly contacts the angled terminus 831 of the female coupling element 830, the slope of the angled terminus 831 induces the male coupling element 852 to rotate to the right. In one or more preferred embodiments, the male coupling element 852 includes a rounded bottom side (as shown in FIG. 8B) that helps induce the male coupling element 852 to rotate when the rounded bottom side of the male coupling element 852 contacts the angled terminus 831. The male coupling element 852 and/or the angled terminus 831 may have one or more of a number of other shapes that similarly induce the male coupling element 852 to rotate into a proper orientation with regard to the slotted portion 833 when the male coupling element 852 contacts the angled terminus 831. Thus, the angled terminus 831 aligns the handle shaft 850 to a position that matches the position of the switch. For example, if the switch (and thus the coupling body 829) is in the open position and the handle (and thus the handle shaft 850) is in the closed position, then as the handle shaft 850 of the handle assembly couples to the coupling body 829 of the switch assembly, the angled terminus 831 aligns the handle shaft 850 of the handle assembly to the open position by rotating the male coupling element 852.

FIG. 8C shows a cross-sectional top view as the handle shaft 850 of the handle assembly couples to the coupling body 829 of the switch assembly. Here, the male coupling element 852 of the handle shaft 850 rotates counter-clockwise along the angled terminus 831 toward alignment with the slotted portion 833 of the female coupling element 830 as the handle shaft 850 of the handle assembly is coupled to (moves downward in FIG. 8C) the coupling body 829 of the switch assembly.

FIG. 8D shows a side view of the handle shaft 850 (and more specifically the male coupling element 852) of the handle assembly coupled to the coupling body 829 (and more specifically the slotted portion 833) of the switch assembly. Specifically, FIG. 8D shows the male coupling element 852 coupled to the slotted portion 833 when the door of the enclosure is fully coupled to (closed against) the enclosure body. The switch in FIG. 8D remains in the open position.

FIG. 8E shows a side view of the handle shaft 850 (and more specifically the male coupling element 852) of the handle assembly coupled to the coupling body 829 (and more specifically the slotted portion 833) of the switch assembly. In this case, the switch position has been changed to the closed position, causing the handle assembly and the switch assembly to rotate in tandem by 90 degrees.

Because the one or more hinges that couple the door of the enclosure to the enclosure body are positioned to the left of the actuator system 800, and because of the orientation of the male coupling element 852 coupled to the slotted portion 833 (a side of the female coupling element 830, and not the slotted portion 833, faces the hinge), the slotted portion 833 prevents the male coupling element 852 from disengaging when the switch (and thus the handle shaft 850 and the coupling body 829) are in the closed position. Specifically, when the switch (and corresponding components of the switch assembly and the handle assembly) is in one or more positions (e.g., the closed position), the male coupling element 852 forms one or more friction paths (contacts) with the slotted portion 833 of the female coupling element 830. As a result, in such positions, the friction paths (contacts) prevent the male coupling element 852 from disengaging from the slotted portion 833 of the female coupling element 830. In this case, the sides of the female coupling element 830 that extend above and form the slotted portion 833 act as a barrier that prevent the male coupling element 852 from leaving the slotted portion 833 when the switch is in the closed position.

As discussed above, the female coupling element 830, the slotted portion 833, and/or the male coupling element 852 may be configured with additional features (e.g., a pin, protruding linear component, a slot) so that the slotted portion 833 of the female coupling element 830 engages the male coupling element 852 of the handle shaft 850 when the handle shaft 850 and the coupling body 829 are in one or more certain positions (e.g., corresponding to when the switch is in a closed position) and so that the slotted portion 833 of the female coupling element 830 is disengaged from the male coupling element 852 of the handle shaft 850 when the handle shaft 850 and the coupling body 829 are in one or more certain other positions (e.g., corresponding to when the switch is in an open position).

FIG. 8F shows a side view of the handle shaft 850 (and more specifically the male coupling element 852) of the handle assembly coupled to the coupling body 829 (and more specifically the slotted portion 833) of the switch assembly. In this case, the switch position has been returned to the open position, causing the handle assembly and the switch assembly to rotate in tandem by 90 degrees in the opposite direction from FIG. 8E. As the door is hingedly separated from the enclosure body (opens), the position of the vertical axis of the shaft assembly becomes out of line with (not parallel to) the vertical axis of the handle assembly.

Because the hinge that couples the door of the enclosure to the enclosure body is positioned to the left of the actuator system 800, and because of the orientation shown in FIG. 8F of the male coupling element 852 coupled to the slotted portion 833 (the opening of the slotted portion 833 facing the hinge), the slotted portion 833 disengages the male coupling element 852 when the switch (and thus the handle shaft 850 and the coupling body 829) are in the open position. In this case, the sides of the female coupling element 830 that extend above and form the slotted portion 833 are not in the path of the male coupling element 852, and so the male coupling element 852 is free to leave the slotted portion 833 when the fastening devices coupling the door to the enclosure body are removed and when the switch is in the open position.

Example 2

Figure 9C:
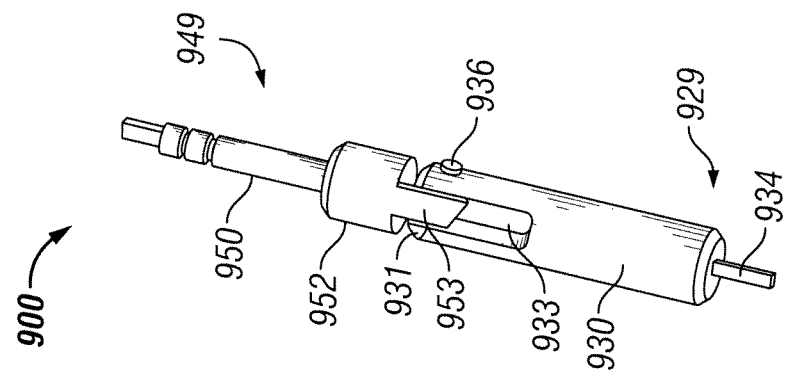
FIGS. 9A through 9C show an example of a configuration of a male coupling element and a female coupling element in accordance with one or more exemplary embodiments.
Figure 9B:
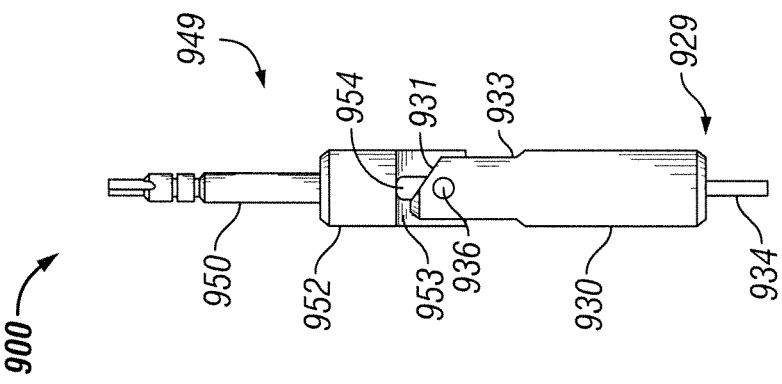
Figure 9A:
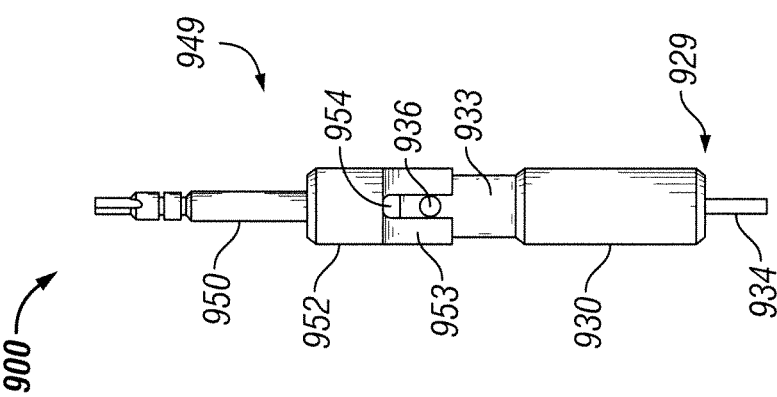

Consider the following example, shown in FIGS. 9A through 9C, which describes an actuator system 900 in accordance with one or more exemplary embodiments described above. FIG. 9A shows a cross-sectional side view of a portion of a handle assembly 949 and a switch assembly 929. Specifically, the handle assembly 949 of FIG. 9A includes a handle shaft 950. The handle shaft 950 includes a male coupling element 952 that is elongated and has a slot 954 formed between two fingers 953. The slot 954 is open at the bottom of the male coupling element 952 and extends vertically upward to where the fingers 953 begin. The fingers 953 may be of the same length or different lengths. The slot 954 is configured to receive a pin 936 of the female coupling element 933 of the coupling body 930.

The portion of the switch assembly shown in FIG. 9A includes a coupling body 930 and a switch shaft 934. The coupling body 930 includes a female coupling element 933 and a pin that extends orthogonally from an inner wall of the female coupling element 933. When the handle shaft 950 of the handle assembly 949 is coupled to the coupling body 930 of the switch assembly 929, the pin 936 of the female coupling element 933 is positioned within the slot 954 of the male coupling element 952 when the handle shaft 950 and the coupling body 930 (and thus the switch) are in one or more positions (e.g., the closed position). Further, when the handle shaft 950 and the coupling body 930 (and thus the switch) are in one or more other positions (e.g., the open position), the pin 936 of the female coupling element 933 is positioned outside of the slot 954 of the male coupling element 952.

FIG. 9B shows a side view (not in cross section) of the actuator system 900 shown in FIG. 9A. Thus, FIG. 9B shows the outer side of the female coupling element 933. In addition, the pin 936 is shown traversing the outer side of the female coupling element 933. In one or more exemplary embodiments, the pin 936 is coupled to both sides of the female coupling element 933 and traverses the slotted portion (not shown in FIG. 9B). The angled terminus 931 of the female coupling element 933 is also shown in FIG. 9B.

FIG. 9C shows a front view of the actuator system 900. The fingers 953 of the male coupling element 952 are shown to be substantially similar in length. Further, the fingers 953 have an angled terminus that compliments the angled terminus 931 of the female coupling element 933. In such a case, the angled terminus of the fingers 953 of the male coupling element 952 and the angled terminus 931 of the female coupling element 933 work together to align the handle assembly 949 as the handle shaft 950 is being coupled to the coupling body 930.

Example 3

Consider the following example, shown in FIGS. 10A and 10B, which describes an actuator system 1000 in accordance with one or more exemplary embodiments described above. In FIGS. 10A and 10B, the coupling body 1029 of the switch assembly includes a switch shaft 1034 and a female coupling element 1030. The female coupling element 1030 includes an angled terminus 1031 and a slotted portion 1033. These elements of the switch assembly in FIGS. 10A and 10B are substantially similar to the corresponding elements of the switch assembly described above with respect to FIGS. 8A through 8F.

A portion of the handle assembly shown in FIGS. 10A and 10B include a handle shaft 1050, which includes a male coupling element 1052. The male coupling element 1052 includes an extended arm 1054 that protrudes from one or more sides of the male coupling element 1052. The extended arm 1054 may be a separate element coupled to the male coupling element 1052. Alternatively, the extended arm 1054 and the male coupling element 1052 may be a single piece. The height of each extended arm 1054 may vary. Here, the height of the extended arm 1054 is approximately half the height of the male coupling element 1052. In one or more exemplary embodiments, the combination of the male coupling element 1052 and the extended arm 1054 are configured to be positioned inside the female coupling element 1033 so that the position of the handle corresponds with the position of the switch.

In FIG. 10A, the extended arm 1054 and/or the male coupling element 1052 contact the angled terminus 1031 of the female coupling element 1030. As the handle assembly moves toward the switch assembly (i.e., as the door of the enclosure closes), the slope of the angled terminus 1031 aligns the combination of the extended arm 1054 and the male coupling element 1052 in a position that corresponds to the position of the switch. FIG. 10B shows the extended arm 1054 and the male coupling element 1052 properly oriented and seated within the female coupling element 1030 when the door to the enclosure is closed. In such a case, the shaft 1050 (as well as the rest of the handle assembly) is in the position that corresponds to the position of the switch (as well as the rest of the switch assembly).

Example 4

Consider the following example, shown in FIGS. 11A and 11B, which describes an actuator system 1100 in accordance with one or more exemplary embodiments described above. In FIGS. 11A and 11B, the coupling body 1129 of the switch assembly includes a switch shaft 1134 and a female coupling element 1130. The female coupling element 1130 includes an angled terminus 1131 and a slotted portion 1133. These elements (except for the slotted portion 1133, described below) of the switch assembly in FIGS. 11A and 11B are substantially similar to the corresponding elements of the switch assembly described above with respect to FIGS. 8A through 8F.

In FIGS. 11A and 11B, the slotted portion 1133 is a hole that traverses at least part of the female coupling element 1130. For example, the slotted portion 1133 may be a hole that begins on an outer side of the female coupling element 1130 and ends at some point inside the female coupling element 1130. The size of the slotted portion 1133 of FIGS. 11A and 11B may be configured to accommodate the male coupling element 1152 of the handle shaft 1150. In this case, the male coupling element 1152 is a hook that is fixedly coupled to the handle shaft 1150.

As with any exemplary embodiment described herein, the male coupling element 1052 may be a separate component that is coupled to the handle shaft 1150. In such a case, the male coupling element 1052 may be coupled to the handle shaft 1150 using one or more of a number of methods, including but not limited to welding, using a fastening device (e.g., a screw), and a threaded coupling. Alternatively, the male coupling element 1052 and the handle shaft 1150 may be a single piece. In one or more exemplary embodiments, the radius of the male coupling element 1152 of FIGS. 11A and 11B corresponds to the pivot angle of the hinge connecting the door to the enclosure body.

In FIG. 11A, the male coupling element 1152 contacts the angled terminus 1131 of the female coupling element 1130. As the handle assembly moves toward the switch assembly (i.e., as the door of the enclosure closes), the slope of the angled terminus 1131 aligns the male coupling element 1152 in a position that corresponds to the position of the switch. As a result, once the handle assembly is properly aligned with the switch assembly, the male coupling element 1152 is properly positioned to engage the slotted portion 1133 of the female coupling element 1130.

FIG. 11B shows the male coupling element 1152 properly oriented and seated within the female coupling element 1130 when the door to the enclosure is closed. In such a case, the shaft 1150 (as well as the rest of the handle assembly) is in the position that corresponds to the position of the switch (as well as the rest of the switch assembly).

One or more exemplary embodiments provide for an actuator system. Specifically, the actuator system provides for self-aligning a handle assembly with a switch assembly as a door of an enclosure is closed, where closing the door causes the handle assembly to couple to the switch assembly. Components (e.g., handle, shaft) of the handle assembly may be in any position of a number of positions before the shaft of the handle assembly is coupled to the coupling body of the switch assembly. One or more exemplary embodiments further provide for mechanically coupling the shaft of the handle assembly to the coupling body of the switch assembly. Specifically, the male coupling element of the shaft is coupled to the female coupling element of the coupling body.

One or more exemplary embodiments further provide for disengaging (or decoupling) the male coupling element of the shaft from the female coupling element of the coupling body when the switch (and thus the components of the handle assembly and the switch assembly) are in one or more of a number of decoupling positions. When the switch is not in the one or more of the number of decoupling positions, the male coupling element of the shaft remains coupled to the female coupling element of the coupling body. In other words, if the switch is not in the one or more of the number of decoupling positions, the door to the enclosure cannot be opened (or the cover cannot be separated from the enclosure body) because the handle assembly remains coupled to the switch assembly. Consequently, a safety feature is added by preventing a user from accessing energized components inside the enclosure.

Although an actuator system for operating a switch located inside an explosion-proof enclosure is described with reference to preferred embodiments, it should be appreciated by those skilled in the art that various modifications are well within the scope of an actuator system for operating a switch located inside an explosion-proof enclosure. From the foregoing, it will be appreciated that an embodiment of an actuator system for operating a switch located inside an explosion-proof enclosure overcomes the limitations of the prior art. Those skilled in the art will appreciate that an actuator system for operating a switch located inside an explosion-proof enclosure is not limited to any specifically discussed application and that the exemplary embodiments described herein are illustrative and not restrictive. From the description of the exemplary embodiments, equivalents of the components shown therein will suggest themselves to those skilled in the art, and ways of constructing other embodiments of an actuator system for operating a switch located inside an explosion-proof enclosure will suggest themselves to practitioners of the art. Therefore, the scope of an actuator system for operating a switch located inside an explosion-proof enclosure is not limited herein.

What is claimed is:

1. An actuator system for operating a switch, the actuator system comprising:
    a shaft of a handle assembly, wherein the shaft is positioned in a plurality of positions and comprises:
        a first shaft end portion for coupling to a handle; and
        a second shaft end portion comprising a male coupling element; and
    a coupling body of a switch assembly, wherein the coupling body is positioned in the plurality of positions and comprises:
        a first coupling end portion for engaging the switch; and
        a second coupling end portion comprising a female coupling element, wherein the female coupling element comprises a slotted portion and an angled terminus, wherein the slotted portion receives the male coupling element of the second shaft end portion,
    wherein the angled terminus of the female coupling element aligns, using the male coupling element, the shaft to a first position of the plurality of positions as the shaft couples to the coupling body,
    wherein the slotted portion receives and engages the male coupling element when the shaft is coupled to the coupling body,
    wherein the plurality of positions corresponds to a plurality of switch positions, and
    wherein, when the shaft is coupled to the coupling body:
        the slotted portion prevents the male coupling element from disengaging when the shaft and the coupling body are in a second position of the plurality of positions, and
        the slotted portion disengages the male coupling element when the shaft and the coupling body are in the first position.

2. The actuator system of claim 1, wherein the first position corresponds to an open position of the switch, and wherein the second position corresponds to a closed position of the switch.

3. The actuator system of claim 1, wherein the male coupling element comprises a slot formed therein, wherein the female coupling element further comprises a pin extending orthogonally therefrom, wherein, when the shaft is coupled to the coupling body, the pin is positioned within the slot when the shaft and the coupling body are in the second position, and wherein the pin is positioned outside the slot when the shaft and the coupling body are in the first position.

4. The actuator system of claim 1, wherein the first coupling end portion is coupled to the switch.

5. The actuator system of claim 1, wherein the shaft traverses an opening in a door of an enclosure, wherein the switch and the coupling body are positioned within the enclosure, and wherein the handle is located outside the enclosure.

6. The actuator system of claim 5, wherein the door of the enclosure cannot be separated from an enclosure body of the enclosure when the handle is in the second position.

7. The actuator system of claim 6, wherein the door of the enclosure is hingedly coupled to the enclosure body on one side of the enclosure body.

8. The actuator system of claim 5, further comprising a switch position indicator affixed to an outer surface of the door adjacent to the handle, wherein the switch position indicator comprises a plurality of designations that correspond to the plurality of switch positions.

9. The actuator system of claim 8, wherein the switch is a disconnect switch, wherein the plurality of switch positions comprise an open position and a closed position, and wherein the plurality of designations on the switch position indicator comprise on and off.

10. The actuator system of claim 5, wherein the enclosure is explosion-proof.

11. The actuator system of claim 10, further comprising:
    a plurality of fastening devices that traverse a plurality of fastening device apertures along a perimeter of the door,
    wherein the plurality of fastening devices, when coupled to the plurality of fastening device apertures, couple the door to the enclosure and prevent the door from separating from the enclosure, and
    wherein the door separates from the enclosure when the plurality of fastening devices are removed from the plurality of fastening device apertures and when the handle is in the first position.

12. The actuator system of claim 1, wherein the shaft and the coupling body are not parallel to each other.

13. A method for operating a switch, the method comprising:
    rotating a handle, mounted on an outer surface of a door coupled to an enclosure body, from a first position of a plurality of positions to a second position of the plurality of positions; and
    separating, after rotating the handle to the second position, the door from the enclosure body, wherein the handle is coupled to a shaft comprising a first shaft end portion for coupling to the handle and a second shaft end portion, wherein the second shaft end portion comprises a male coupling element that is aligned with a female coupling element of a first coupling end portion of a coupling body, wherein the coupling body comprises a second coupling end portion for engaging the switch, wherein the female coupling element comprises a slotted portion and an angled terminus, wherein the slotted portion receives and engages the male coupling element of the second shaft end portion when the shaft is coupled to the coupling body, wherein the plurality of positions corresponds to a plurality of switch positions, wherein the slotted portion prevents the male coupling element from disengaging when the shaft and the coupling body are in the first position, and wherein the slotted portion disengages the male coupling element when the shaft and the coupling body are in the second position.

14. The method of claim 13, further comprising:
coupling, prior to rotating the handle, the door to the enclosure body; and
rotating the handle from the second position to the first position,
wherein the angled terminus of the female coupling element aligns, using the male coupling element, the shaft to the second position of the plurality of positions as the shaft couples to the coupling body, and
wherein the slotted portion receives, after the angled terminus aligns the shaft, the male coupling element.

15. The method of claim 13, wherein the first position of the handle corresponds to a closed switch position, and wherein the second position of the handle corresponds to an open switch position.

16. The method of claim 13, wherein the male coupling element further comprises a slot formed therein, wherein the female coupling element further comprises a pin extending orthogonally therefrom, wherein the pin is positioned within the slot when the handle is in the first position, and wherein the pin is positioned outside the slot when the handle is in the second position.

17. The method of claim 13, wherein the shaft traverses an opening in the door, wherein the switch and the coupling body are positioned within the enclosure body, and wherein the handle is located outside the enclosure on an outer surface of the door.

18. The method of claim 17, wherein the door cannot be separated from the enclosure body when the handle is in the first position.

19. The method of claim 17, wherein a switch position indicator is affixed to the outer surface of the door adjacent to the handle, wherein the switch position indicator comprises a plurality of designations that correspond to the plurality of switch positions.

20. The method of claim 19, wherein the switch is a disconnect switch, wherein the plurality of switch positions comprise an open position and a closed position, and wherein the plurality of designations on the switch position indicator comprise on and off.

21. The method of claim 13, wherein the door coupled to the enclosure body creates an explosion-proof enclosure.

22. The method of claim 21, wherein the door is coupled to the enclosure body using a plurality of fastening devices that traverse a plurality of fastening device apertures along a perimeter of the door and an outer surface of the enclosure body, wherein the door is hingedly coupled to the enclosure body using one or more hinges located on one side of the enclosure body, and wherein the door separates from the enclosure body, while coupled at the one or more hinges, when the plurality of fastening devices are removed from the plurality of fastening device apertures and when the handle is in the second position.

\* \* \* \* \*